US010983777B2

(12) United States Patent
Fumey et al.

(10) Patent No.: US 10,983,777 B2
(45) Date of Patent: Apr. 20, 2021

(54) METHOD AND ELECTRONIC DEVICE FOR INSTALLING AVIONICS SOFTWARE APPLICATIONS ON A PLATFORM COMPRISING A MULTI-CORE PROCESSOR, RELATED COMPUTER PROGRAM AND ELECTRONIC SYSTEM

(71) Applicant: THALES, Courbevoie (FR)

(72) Inventors: Marc Fumey, Mérignac (FR); Joël Bosson, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/517,179

(22) Filed: Jul. 19, 2019

(65) Prior Publication Data

US 2020/0034130 A1    Jan. 30, 2020

(30) Foreign Application Priority Data

Jul. 26, 2018 (FR) ...................................... 1800808

(51) Int. Cl.
*G06F 9/44* (2018.01)
*G06F 9/445* (2018.01)
(Continued)

(52) U.S. Cl.
CPC ............... *G06F 8/61* (2013.01); *B64D 45/00* (2013.01); *G06F 9/3877* (2013.01); *G06F 9/3891* (2013.01)

(58) Field of Classification Search
CPC ........ G06F 8/61; G06F 9/3877; G06F 9/3891; B64D 45/00
See application file for complete search history.

(56) References Cited

U.S. PATENT DOCUMENTS

| 5,553,237 A * | 9/1996 | Eisenberg | ........... | G06F 11/0751 |
| | | | | 714/26 |
| 2006/0070054 A1* | 3/2006 | Naik | ....................... | G06F 8/656 |
| | | | | 717/165 |

(Continued)

FOREIGN PATENT DOCUMENTS

WO    WO 2016/034447 A1    3/2016

OTHER PUBLICATIONS

Aerospace, Using multi-core processors effectively in aerospace and defense programs, 2016, pp. 1-16. https://www.intelligent-aerospace.com/avionics/article/16538656/using-multicore-processors-effectively-in-aerospace-and-defense-programs (Year: 2016).*

(Continued)

*Primary Examiner* — Mongbao Nguyen
(74) *Attorney, Agent, or Firm* — Arent Fox LLP (57) ABSTRACT

This method for installing avionics software applications on a platform with a multi-core processor and intended to be on board an aircraft is implemented by an electronic installation device. Each avionics software application includes one or several software processing operations to be executed over a predefined time period including one or several successive time clusters.

It comprises determining an installation plan for the software processing operations according to a first installation rule and/or a second installation rule, the installation plan defining, for each software processing operation, at least one core and at least one time cluster that are associated with said software processing operation, the first rule consisting of predetermining a list of authorized combinations of criticality levels for applications intended to be executed during a same time cluster, and the second rule consisting of prohibiting installation of critical software application(s) on one or several cores of the plurality of cores.

13 Claims, 4 Drawing Sheets

(51) Int. Cl.
*G06F 8/61* (2018.01)
*B64D 45/00* (2006.01)
*G06F 9/38* (2018.01)

(56) References Cited

U.S. PATENT DOCUMENTS

| | | | | |
|---|---|---|---|---|
| 2011/0126188 A1* | 5/2011 | Bernstein | ............ | G06F 11/3688 717/174 |
| 2013/0166271 A1* | 6/2013 | Danielsson | ............. | G06F 30/20 703/22 |
| 2013/0247025 A1* | 9/2013 | Barberet | ................... | G06F 8/61 717/173 |
| 2014/0282491 A1* | 9/2014 | Baraldi | ..................... | G06F 8/61 717/174 |
| 2015/0331829 A1* | 11/2015 | Wang | ........................ | G06F 9/52 710/108 |
| 2015/0338835 A1* | 11/2015 | Holler | .................. | G05B 19/048 700/79 |
| 2016/0070659 A1* | 3/2016 | Pohlack | .............. | G06F 12/0857 711/122 |
| 2016/0253471 A1* | 9/2016 | Volpe | .................... | G06F 9/4401 607/5 |
| 2017/0046246 A1* | 2/2017 | Kaulgud | ............. | G06F 11/3664 |
| 2017/0262277 A1* | 9/2017 | Endo | ........................ | G06F 8/65 |
| 2018/0095784 A1* | 4/2018 | Gauffriau | .............. | G06F 9/4812 |
| 2018/0101377 A1* | 4/2018 | Wingate, Jr. | .............. | G06F 8/61 |
| 2018/0322014 A1* | 11/2018 | Persson | ..................... | G06F 8/61 |
| 2019/0050220 A1* | 2/2019 | Daum | ................. | B61L 15/0072 |
| 2019/0179756 A1* | 6/2019 | Zaykov | ............... | G06F 12/0848 |
| 2019/0278587 A1* | 9/2019 | Miyake | ..................... | G06F 8/60 |
| 2019/0332369 A1* | 10/2019 | Gupta | ..................... | G06F 3/067 |
| 2019/0340140 A1* | 11/2019 | Sozzi | ................... | G06F 9/3816 |

OTHER PUBLICATIONS

Michael Paulitsch, Mixed-Criticality Embedded Systems—A Balance Ensuring Partitioning and Performance, 2015, pp. 453-460. https://dl.acm.org/doi/10.1109/DSD.2015.100 (Year: 2015).*

Sylvain Girbal, Deterministic Platform software for hard real-time systems using multi-core COTS, 2015, pp. 1-11. https://ieeexplore.ieee.org/document/7311481 (Year: 2015).*

Aerospace, Using multi-core processors effectively in aerospace and defense programs, 2016, pp. 1-19. https://www.intelligent-aerospace.com/avionics/article/16538656/using-multicore-processors-effectively-in-aerospace-and-defense-programs (Year: 2016).*

Andreas Lofwenmark, Timing Predictability in Future Multi-Core Avionics Systems, 2017, pp. 1-101. https://liu.diva-portal.org/smash/get/diva2:1079456/FULLTEXT01.pdf (Year: 2017).*

French Search Report, from the French Patent Office in counterpart French Application No. 1800808, dated May 10, 2019.

Giannopoulou, G. et al., "DOL-BIP-Critical: a tool chain for rigorous design and implementation of mixed-criticality multi-core systems", Design Automation for Embedded Systems, Springer, vol. 22, pp. 141-181, (2018).

Igna, G. et al., "Model-Based Deployment Generation for Safety-Critical Avionics Systems", 2017 12th IEEE International Symposium on Industrial Embedded Systems (SIES), (8 Pages Total), 2017.

* cited by examiner

METHOD AND ELECTRONIC DEVICE FOR INSTALLING AVIONICS SOFTWARE APPLICATIONS ON A PLATFORM COMPRISING A MULTI-CORE PROCESSOR, RELATED COMPUTER PROGRAM AND ELECTRONIC SYSTEM

CROSS-REFERENCE TO RELATED APPLICATIONS

This application is a U.S. non-provisional application claiming the benefit of French Application No. 18 00808, filed on Jul. 26, 2018, which is incorporated herein by reference in its entirety.

FIELD

The present invention relates to a method for installing avionics software applications on a platform intended to be on board an aircraft, the platform comprising a multi-core processor having a plurality of separate cores, the installation method being implemented by an electronic installation device.

The invention also relates to a non-transitory computer-readable medium including a computer program including software instructions which, when executed by a computer, implement such a method.

The invention also relates to an electronic device for installing avionics software applications on a platform intended to be on board an aircraft, the platform comprising a multi-core processor having a plurality of separate cores.

The invention also relates to an electronic system comprising a memory able to store avionics software applications; a platform able to execute each avionics software application, the platform comprising a multi-core processor having a plurality of separate cores; and such an electronic device for installing avionics software applications on the platform.

The invention relates to the field of the qualification of on-board platforms including one or several multi-core processors, in particular in the avionics field according to standard DO297.

BACKGROUND

Using multi-core processors creates substantial difficulty for the qualification of the platforms. Indeed, running several software applications at the same time on one multi-core processor creates risks of contention due to the sharing of common resources (bus, memory) with different cores, the behavior of the multi-core processor not being able to be controlled easily.

The term "contention" refers to any situation in which at least one activity carried out by at least one core of a multi-core processor experiences delays in its performance due to the temporal parallelism allowed by said multi-core processor.

The origin of the contentions is generally the use of shared resources of the processor or the operating system, also called OS, resulting in waits causing these delays. A contention then causes a delay in the execution of a software application hosted in a core.

A first example of contention is the bus (often called "interconnect") connecting the cores to one another, which does not always allow simultaneous transactions between cores or between the cores and the peripherals, such as certain integrated cache memories or the external memory.

Another example of contention is the use of common software modules of the OS installed on one of the cores and called by all of the cores, potentially at the same time. Simultaneous calls for such shared software modules lead to arbitration and the placement of some requests in standby in order to serialize the software processing operations on the core where the shared software module is installed.

Another example of contention is a temporary interruption of all of the cores on a particular event on one of the cores in order to manage a coherent status among all of the cores.

When the processor is further a processor purchased from a supplier, or a COTS (Commercial Off-The-Shelf) processor, it is generally impossible to access the design details of the internal members of such a multi-core processor, and it is therefore very difficult, if not impossible, to guarantee a deterministic behavior of the processor.

According to a first known type of software architecture for a platform with a multi-core processor, also called SMP (Symmetrical Multi-Processing) architecture, an operating system decides at each moment which software processing operation is executed on which core.

According to a second known type of software architecture for a platform with a multi-core processor, also called AMP (Asymmetrical Multi-Processing) architecture, each core sequences the execution of a set of software applications, independently from one core to the next, with one operating system per core.

However, such architectures are not robust enough to obtain the qualification of platforms with multi-core processors, in particular in the avionics field according to standard DO297.

SUMMARY

The aim of the invention is then to propose a method and a device for installing avionics software applications on a platform with multi-core processor(s), which make it possible to limit the risks of contention during the execution of said software applications and then to facilitate the qualification of the platform.

To that end, the invention relates to a method for installing avionics software applications on a platform intended to be on board an aircraft, the platform comprising a multi-core processor having a plurality of separate cores, each avionics software application including one or several software processing operations to be executed over a predefined time period, the predefined time period including one or several successive time clusters, the installation method being implemented by an electronic installation device and comprising the following step:
  determining an installation plan for the software processing operations according to at least one rule from among a first installation rule and a second installation rule, the installation plan defining, for each software processing operation, at least one core and at least one time cluster that are associated with said software processing operation,
    the first installation rule consisting of predetermining a list of authorized combinations of criticality levels for applications intended to be executed during a same time cluster on the platform,
    the second installation rule consisting of prohibiting the installation of critical software application(s) on one or several cores of the plurality of cores of the multi-core processor.

With the installation method according to the invention, compliance with the first installation rule and/or the second installation rule to determine the installation plan of the software processing operations makes it possible to limit the contention risks.

Indeed, with the first installation rule consisting of predetermining a list of authorized combinations of criticality levels for applications intended to be executed during a same time cluster, the installation of the avionics software applications on the platform is optimized based on failure probabilities, in order to reduce these contention risks.

Likewise, the the second installation rule consisting of prohibiting the installation of critical software application(s) on one or several cores of the plurality of cores of the multi-core processor makes it possible to create a sanctuary for these critical applications in case of extreme contention.

The proper operation within the sanctuary is for example further improved by the detection of contention(s), and if applicable on a corrective basis in response to this contention detection, the gradual stopping of the least critical applications on the other core(s).

According to other advantageous aspects of the invention, the installation method comprises one or more of the following features, considered alone or according to all technically possible combinations:

- for the first installation rule, the probability of two software applications having a same given criticality level being faulty is considered to be substantially equal to the probability of a software application having a criticality level one unit higher than said given criticality level being faulty.
- for the second installation rule, each critical software application has a criticality level corresponding to a Design Assurance Level ("DAL") level defined according to standard DO-178 revision B and following, or according to standard ARP4754,
  the criticality level preferably being equal to level DAL A or to level DAL B,
  the levels DAL A and DAL B still preferably being considered the most critical;
- during the determining step, the installation plan is determined according to the first and second installation rules;
- during the determining step, the installation plan is further determined according to a third installation rule depending on a worst-case execution time of the respective software processing operation, said worst-case execution time being increased by an increase associated with the platform,
- for the fourth installation rule, the increase of the worst-case execution time depending preferably on a predefined maximum contention rate, associated with the platform;
- during the determining step, the installation plan is further determined according to a fourth installation rule consisting of taking into account an additional time margin for each critical software application,
  each critical software application preferably having a criticality level corresponding to a DAL level defined according to standard DO-178 revision B and following, or according to standard ARP4754,
  the criticality level preferably being equal to level DAL A or to level DAL B,
  the levels DAL A and DAL B still preferably being considered the most critical;
- the method further comprises a step for testing the determined installation plan, carried out after the determining step, the test step including a simultaneous implementation of one or several avionics software applications and one or several test applications,
  at least one test application preferably being representative of contention(s) with an intensity greater than or equal to a predefined contention threshold; and
  the platform hosts a single operating system for all the cores and/or an operating system for each core.

The invention also relates to a non-transitory computer-readable medium including a computer program including software instructions which, when executed by a computer, implement an installation method as defined above.

The invention also relates to an electronic installation device for installing avionics software applications on a platform intended to be on board an aircraft, the platform comprising a multi-core processor having a plurality of separate cores, each avionics software application including one or several software processing operations to be executed over a predefined time period, the predefined time period including one or several successive time clusters, the device comprising a determining module configured to determine an installation plan for the software processing operations according to at least one rule from among a first installation rule and a second installation rule, the installation plan defining, for each software processing operation, at least one core and at least one time cluster that are associated with said software processing operation, the first installation rule consisting of predetermining a list of authorized combinations of criticality levels for applications intended to be executed during a same time cluster on the platform, the second installation rule consisting of prohibiting the installation of critical software application(s) on one or several cores of the plurality of cores of the multi-core processor.

The invention also relates to an electronic system comprising:

a memory able to store avionics software applications;
a platform able to execute each avionics software application, the platform comprising a multi-core processor having a plurality of separate cores; and
an electronic installation device for installing avionics software applications on the platform, the electronic installation device being as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
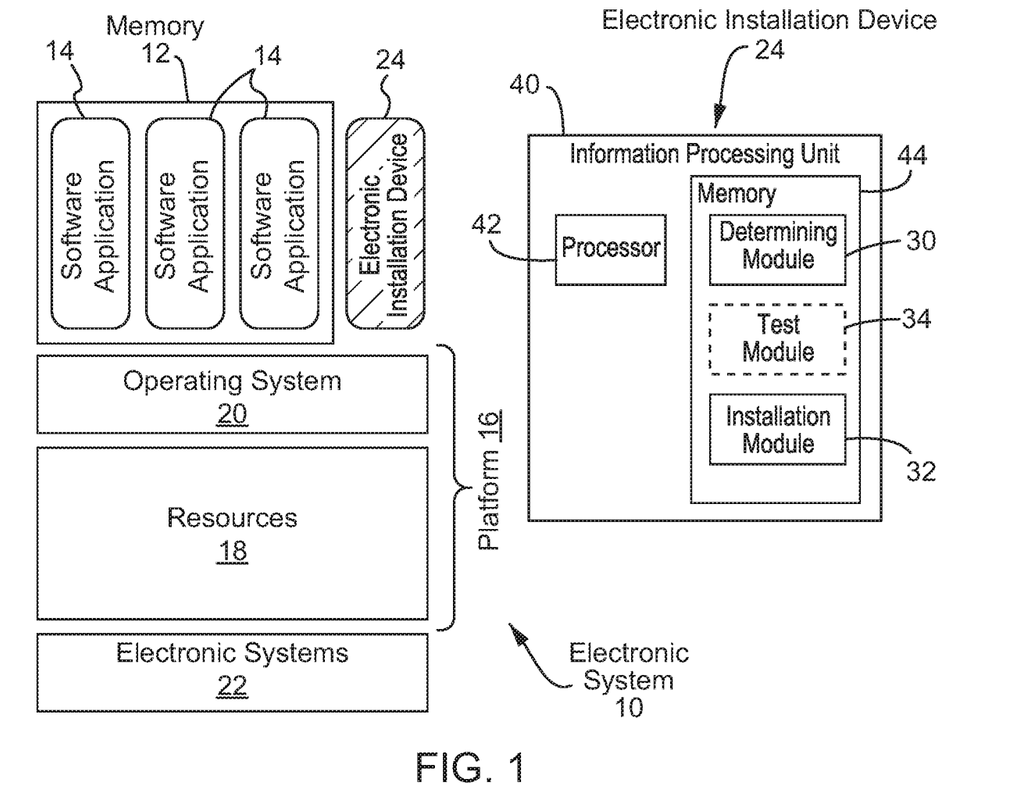
FIG. 1 is a schematic illustration of an electronic system according to the invention, comprising a memory able to store software applications; a platform able to execute each software application, the platform including resources, in particular at least one multi-core processor having several separate cores, and hosting an operating system; and an electronic device for installing avionics software applications on the platform, each avionics software application including one or several software processing operations to be executed during a predefined time period.

In FIG. 1, an electronic system 10, in particular an avionics electronic system intended to be on board an aircraft, comprises a memory 12 able to store software applications 14, a platform 16 able to execute each software application 14, the platform 16 including resources 18 and hosting at least one operating system 20, the platform 16 being connected to other electronic systems 22 of the aircraft, such as other electronic avionics systems of the aircraft.

The electronic system 10 further comprises, according to the invention, an electronic device 24 for installing avionics software applications 14 on the platform 16.

In FIG. 1, to simplify the drawing, the memory 12 has been shown outside the rectangle symbolizing the resources 18, in order to provide a distinct illustration of the software layer corresponding to the software applications 14, as well as the installation device 24, if applicable. Nevertheless, one skilled in the art will of course understand that the memory 12 is included in the resources 18 of the platform 16.

The aircraft is preferably an airplane. Alternatively, the aircraft is a helicopter, or a drone piloted remotely by a pilot.

In the example of FIG. 1, the memory 12 is able to store three separate software applications 14, and the electronic installation device 24 is then configured to install these avionics software applications 14 on the platform 16.

Each software application 14 is intended to be executed by the platform 16 and then designed to emit one or several calls to the operating system 20 hosted by the platform 16 and is also configured to use resources 18 of the platform 16.

When the electronic system 10 is an electronic avionics system on board the aircraft, each software application 14 is also called avionics function. The software applications 14 for example perform different functions to carry out a flight, and are for example installed on different platforms 16 and use the resources 18 of said platforms 16.

Figure 3:
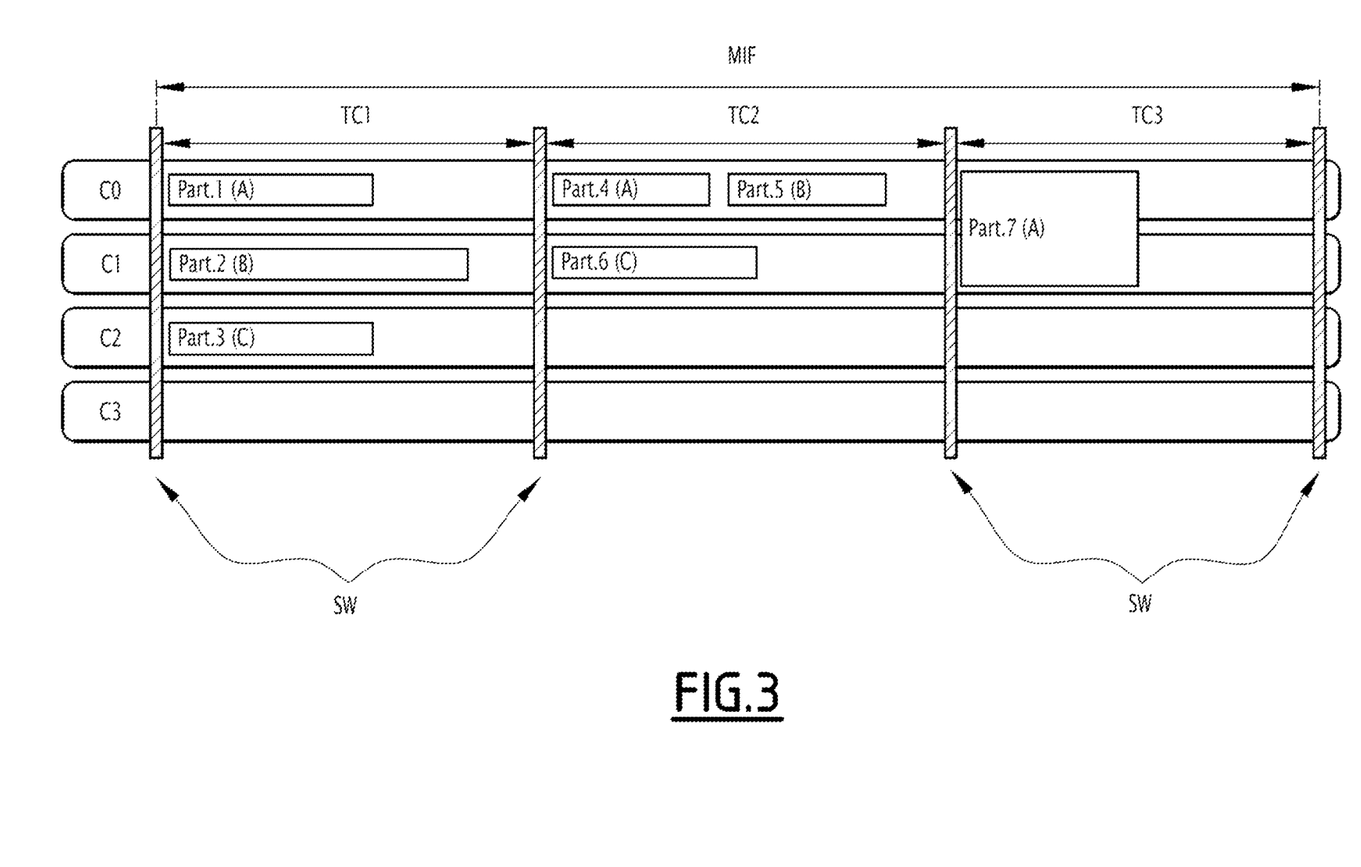
FIG. 3 is a schematic illustration of an installation of avionics software applications on the platform, equipped with a quad-core processor.

Each avionics software application 14 includes one or several software processing operations to be executed over a predefined time period, the predefined denoted MIF (Minor Frame) in FIG. 3, the predefined time period MIF including one or several successive time clusters, also denoted TC.

A software processing operation refers to a set of operations on data of the avionics software application 14 making it possible to perform parts of an avionics function, such as an acquisition or a transmission of data, mathematical calculations, logic processing operations, a data manipulation.

Each software processing operation is also called process, or software process. A software processing operation is for example a process within the meaning of standard ARINC 653.

Such functions being critical, for example the braking system or the flight management system, the execution of each software application 14 must be separated robustly from the execution of the other software applications 14, throughout their entire execution duration, and the installation of the software applications 14 must then be done accordingly by the electronic installation device 24.

The platform 16 is in particular intended to be on board the aircraft. The platform 16 is for example an information processing unit made up of one or several memories associated with one or several processors.

The invention is applicable to different types of software architectures, in particular to a so-called symmetrical multiprocessing (SMP) architecture, or to an asymmetrical multiprocessing (AMP) architecture.

An SMP more specifically refers to a software architecture where the operating system 20 decides at each moment which process is executed on which processor core.

In the case of the SMP architecture, the platform 16 for example comprises a single operating system 20, and a single partition is active at a given moment in time. For the SMP architecture, the platform 16 then hosts a single operating system 20 for all of the cores.

In the case of the SMP architecture, the installation of software applications 14 is for example done in parallel on several cores.

An AMP architecture more specifically refers to a software architecture where each core sequences a set of software applications independently of the other cores.

In the case of the AMP architecture, the platform 16 for example comprises a plurality of operating systems 20, while hosting an operating system 20 for each core, then making it possible to activate different partitions at a given moment in time.

In the case of the AMP architecture, the installation of software applications 14 is for example done sequentially on a single core independently of the other cores.

The resources 18 of the platform 16 are physical or logic elements capable of being provided to the software application(s) 14.

The resources 18 are for example broken down into the following categories: data processing resources, such as one or several processors; memory resources; input and output resources; resources specific to the avionics network, such as communication routers of an ARINC664 network; graphic resources, i.e., allowing data to be displayed; and mass memory resources.

The operating system 20 is for example an operating system according to the ARINC 653 standard, or a POSIX operating system, or a hypervisor, or middleware. One skilled in the art will then understand that the operating system 20 is to be understood broadly, and is more generally a set of at least one system software program, designed to offer services of different types to each application 14.

As an optional addition, the electronic installation device 24 is configured to install the avionics software applications 14 on the platform 16 and comprises a determining module 30 configured to determine an installation plan for the software processing operations according to at least one rule from among a first installation rule and a second installation rule, the installation plan defining, for each software processing operation, at least one core and at least one time cluster TC that are associated with said software processing operation.

The electronic installation device 24 comprises an installation module 32 configured to install the avionics software applications 14 on the platform 16, according to the installation plan determined by the determining module 30.

As an optional addition, the electronic installation device 24 comprises a test module 34 configured to test the installation plan determined by the determining module 30, the test module 34 being suitable for simultaneously implementing one or several avionics software applications and one or several test applications. Each test application is preferably representative of contention(s) with an intensity greater than or equal to a predefined contention threshold.

The installation device 24 is preferably separate from the platform 16, and comprises an information processing unit 40 for example made up of a processor 42 associated with a memory 44.

In a variant, as shown in crosshatched form in FIG. 1, the installation device 24 is for example able to be at least partially, preferably for the determining module 30 and/or the installation module 32, executed directly by the platform 16 and then to use its resources 18. The installation device 24 is then preferably further hosted by the operating system 20.

In the example of FIG. 1, whether the installation device 24 is separate from the platform 16 or hosted and executed by the platform 16, the determining module 30, the installation module 32 and, as an optional addition, the test module 34, are each made in the form of software, or a software component, executable by a processor, such as the processor 42 when the installation device 24 is separate from the platform 16. The memory 44 of the installation device 24 is then able to store determining software of the installation plan for the software processing operations according to at least one rule from among the first installation rule and the second installation rule, and installation software for the avionics software applications 14 on the platform 16. As an optional addition, the memory 44 of the electronic installation device 24 is able to store test software for the installation plan determined by the determining software, the test software being suitable for simultaneously implementing one or several avionics software applications and one or several test applications.

In a variant that is not shown, the determining module 30, the installation module 32, and as an optional addition the test module 34, are each made in the form of a programmable logic component, such as an FPGA (Field Programmable Gate Array), or in the form of a dedicated integrated circuit, such as an ASIC (Applications Specific Integrated Circuit).

When the installation device 24 is made in the form of one or several software programs, i.e., in the form of a computer program, it is further able to be stored on a non-transitory medium, not shown, readable by computer. The non-transitory computer-readable medium is for example a medium suitable for storing electronic instructions and able to be coupled with a bus of a computer system. As an example, the readable medium is a floppy disk, an optical disc, a CD-ROM, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The determining module 30 is configured to determine the installation plan of the software processing operations according to at least one rule from among the first installation rule and the second installation rule.

The determining module 30 is preferably configured to determine the installation plan of the software processing operations according to the first and second installation rules at once.

The first installation rule consists of predetermining a list of authorized combinations of criticality levels for applications intended to be executed during a same time cluster TC on the platform 16.

Each avionics software application 14 for example has a criticality level corresponding to a DAL level defined according to standard DO-178 revision B and following, or according to standard ARP4754. Level DAL A is the highest criticality level, and level DAL D is the lowest criticality level, according to the following sequencing: DAL A>DAL B>DAL C>DAL D.

An avionics software application 14 is said to be critical when its criticality level is above or equal to a predefined threshold, for example level DAL B. In other words, each critical software application has a criticality level preferably equal to level DAL A or to level DAL B, levels DAL A and DAL B preferably also being considered the most critical.

Figure 4:
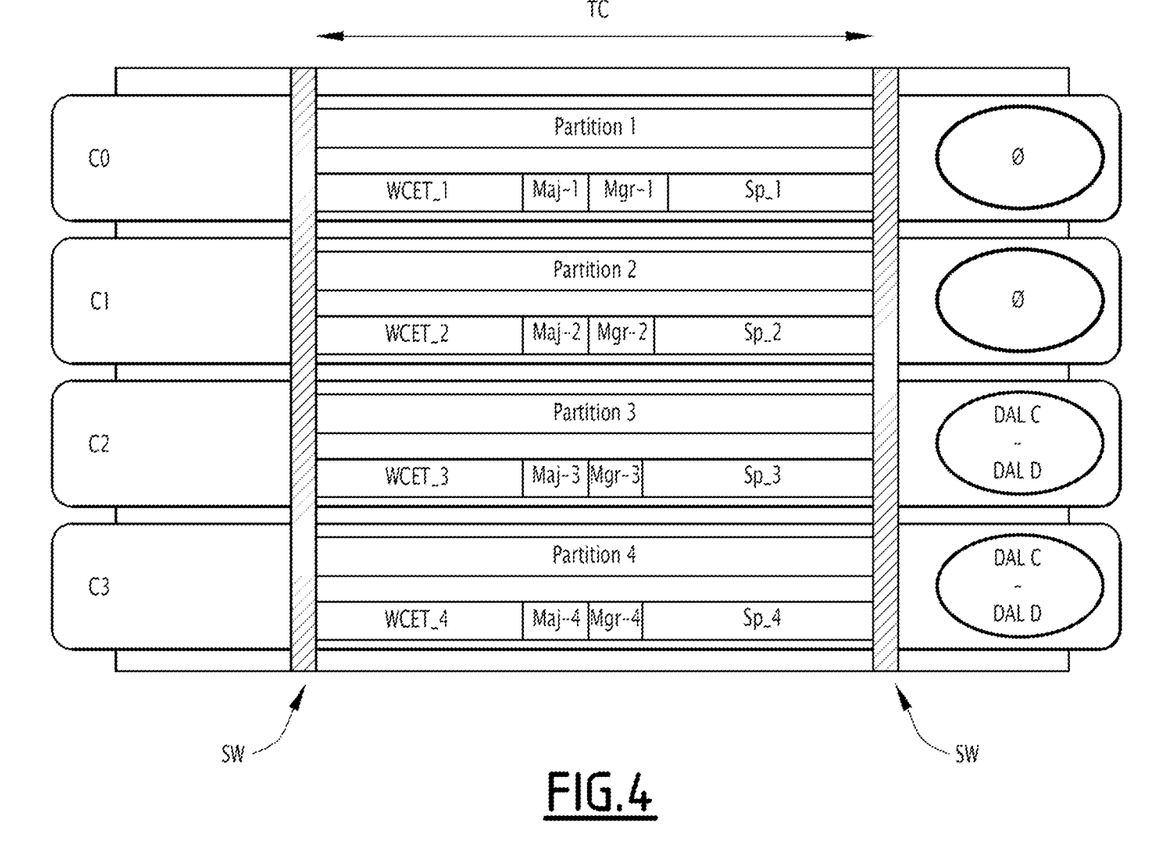
FIG. 4 is a schematic illustration illustrating an installation rule depending on a worst-case execution time (WCET) of the respective software processing operation, said worst-case execution time (WCET) being increased by an increase associated with the platform, and another installation rule consisting of prohibiting the installation of critical software application(s) on one or several cores of the plurality of cores of the multi-core processor, each critical software application for example having a criticality level corresponding to a DAL level.

In the example of FIG. 4, the multi-core processor is a quad-core processor, and the partition 1 is associated with a first core denoted C0, the partition 2 being associated with a second core denoted C1, the partition 3 is associated with a third core denoted C2 and the partition 4 with a fourth core denoted C3.

In the example of FIG. 4 where the third core C2 and the fourth core C3 are reserved for the avionics software applications 14 having a criticality level equal to DAL C or DAL D, a list of authorized combinations according to the first installation rule is indicated as an example hereinafter.

In this example of FIG. 4, the platform absorbs any abnormal situation coming from applications for 2 cores. As a result, the combinations with 3 cores are all authorized if they respect the installation rule(s) other than the first installation rule.

Restrictions appear for configurations with 4 or more cores. In this example, the following principle of association of the applications is implemented:

the probability of two software applications having a same given criticality level being faulty is preferably considered to be substantially equal to the probability of a software application having a criticality level one unit higher than said given criticality level being faulty, which is for example expressed by $B*B=A$, $C*C=B$ or $D*D=C$; and the association of two applications having a different criticality level is equivalent to a software application having a criticality level one unit higher than the application with the lower criticality level, which is for example expressed by $D*C=C$, or $D*B=C$, where each letter A, B, C and D respectively designates the criticality level DAL A, DAL B, DAL C and DAL D the considered application.

According to the first installation rule, for an application with a given criticality level, it is then necessary for the combination of the other applications to be at worst of the same criticality level, which reflects the elimination of the risk that the other applications are faulty with an unacceptable probability.

In this example with 4 cores, the following combinations are then prohibited:

A/D/D/D because (D*D)*D=C<A
A/C/D/D because (D*D)*C=B<A
A/B/D/D because (D*D)*B=B<A
A/B/C/D because (D*C)*B=B<A
B/D/D/D because (D*D)*D=C<B where the letters A, B, C and D respectively designate the criticality level DAL A, DAL B, DAL C and DAL D of the application intended to be installed on a respective core, the '/' symbol representing the separation between two successive cores.

The second installation rule consists of prohibiting the installation of critical software application(s) on one or several cores of the plurality of cores of the multi-core processor.

In the example of FIG. 4, the third core C2 and the fourth core C3 are for example reserved for the avionics software applications 14 having a criticality level equal to DAL C or DAL D, as symbolized by the mention "DAL C-DAL D" between ellipses for the third core C2 and the fourth core C3. In other words, the installation of critical software application(s) with criticality level DAL A or DAL B is, in this example, prohibited on the third core C2 and the fourth core C3. The symbol "Ø" between ellipses for the first core C0 and the second core C1 indicates that there is no restriction on installation of critical software application(s) on these cores C0, C1.

Also as an optional addition, the determining module 30 is configured to determine the installation plan of the software processing operation further according to a third installation rule depending on a worst-case execution time $WCET\_i$ of the respective software processing operation, said worst-case execution time $WCET\_i$ being increased by an increase $Maj\text{-}i$ associated with the platform 16.

In the example of FIG. 4, each partition i, with i an integer index respectively equal to 1, 2, 3 and 4, is associated with a respective software processing operation, and each worst-case execution time $WCET\_i$ is increased by an increase $Maj\text{-}i$ associated with the platform 16.

This increase $Maj\text{-}i$ of the worst-case execution time $WCET\_i$ is an additional margin offering a safer operation of each avionics software application 14.

The worst-case execution time $WCET\_i$ is typically around several ms, for example between 2 ms and 50 ms, for example between 5 ms and 20 ms.

The applied increase $Maj\text{-}i$ for example represents between 5% and 30% of the associated worst-case execution time $WCET\_i$, still more preferably between 10% and 20% of said worst-case execution time $WCET\_i$.

For the third installation rule, the increase $Maj\text{-}i$ of the worst-case execution time $WCET\_i$ for example depends on a predefined maximum contention rate, associated with the platform 16.

This increase $Maj\text{-}i$ as a function of the maximum contention rate for example results from a characterization of the platform with respect to contentions generated by the execution in parallel of different software applications on several cores of the multi-core processor.

The increase $Maj\text{-}i$ is preferably independent of the criticality level of the avionics software application 14 corresponding to the software processing operation with which the increase $Maj\text{-}i$ is associated.

As previously indicated, "contention" refers to a situation in which at least one processing operation executed by at least one core of a multi-core processor experiences delays in its performance due to the temporal parallelism allowed by said multi-core processor.

Maximum contention rate refers to the ratio between the execution time of a respective application experiencing contentions in the worst possible contention situation and the execution time of said application without contention.

As an optional addition, the determining module 30 is configured to determine the installation plan of the software processing operations further according to a fourth installation rule consisting of taking into account an additional time margin $Mrg\text{-}i$ for each critical software application.

This fourth installation rule makes it possible to justify better robustness in light of the safety constraints for critical software applications having a criticality level preferably equal to level DAL A or level DAL B. The additional time margin $Mrg\text{-}i$ then offers an even safer operation of each critical avionics software application 14 while making it possible to absorb contentions that may have escaped a prior characterization measure.

The additional time margin $Mrg\text{-}i$ preferably depends on a criticality level of the avionics software application 14 to which the considered processing belongs. Also preferably, the higher the criticality of the avionics software application 14 is, the greater the associated additional time margin $Mrg\text{-}i$ is.

Beyond the worst-case execution time $WCET\_i$ increased by the increase $Maj\text{-}i$ and the additional time margin $Mrg\text{-}i$, a time supplement $Sp\_i$ (called Spare) is, as an optional addition, allocated to the application and then forms an additional time margin, traditionally usable by this application for its upgrades.

In the example of FIG. 4, the criticality level of the partition 1 is DAL A, that of the partition 2 is DAL B, that of the partition 3 is DAL C, and that of the partition 4 is DAL D. The additional time margin $Mrg\text{-}1$ for partition 1 is then greater in duration than that $Mrg\text{-}2$ for partition 2, which in turn is greater in duration than that $Mrg\text{-}3$ for partition 3, which in turn is greater in duration than that $Mrg\text{-}4$ for partition 4.

In a variant, the fourth installation rule consists of taking into account an additional time margin $Mrg\text{-}i$ for each critical software application. The prior characterization and the increase $Maj\text{-}i$ of the associated worst-case execution time $WCET\_i$ are then considered to be sufficient in terms of safety for noncritical software applications, for example having a criticality level lower than or equal to level DAL C. By applying this variant to the example of FIG. 4 and taking the example where the noncritical software applications are those having a criticality level lower than or equal to level DAL C, the additional time margin $Mrg\text{-}3$ is then nil for partition 3 of level DAL C, as is the additional time margin $Mrg\text{-}4$ for partition 4 of level DAL D. In other words, no additional time margin $Mrg\text{-}i$ is then associated with partitions 3 and 4.

The determining module 30 is thus configured to determine the installation plan of the software processing operations according to at least one rule from among the first, second, third and fourth installation rules.

The determining module 30 is preferably configured to determine the installation plan of the software processing operations according to several rules at once from among the first, second, third and fourth installation rules. The determining module 30 is also preferably configured to determine the installation plan of the software processing operations according to three rules at once, and preferably also according to all of the rules at once, from among the first, second, third and fourth installation rules.

The installation module 32 is then configured to install the avionics software applications 14 on the platform 16 and according to the installation plan determined by the determining module 30.

The test module 34 is configured to test the installation plan determined by the determining module 30. The test module 34 is suitable for simultaneously implementing one or several avionics software applications and one or several test applications.

At least one test application is preferably representative of contention(s) with an intensity greater than a predefined contention threshold.

Figure 5:
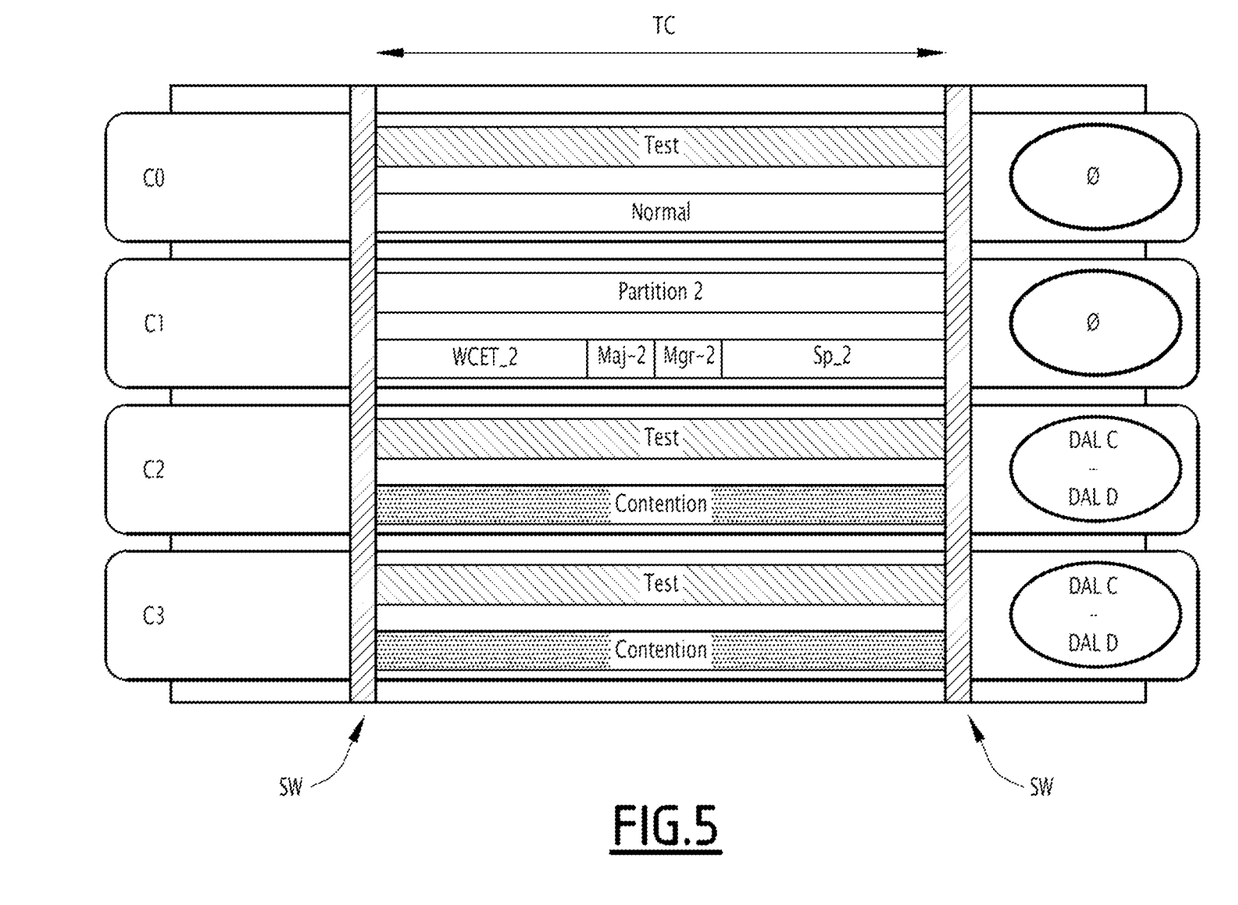
FIG. 5 is a schematic illustration illustrating a test of the determined installation plan, with the simultaneous implementation of an avionics software application on one core and test applications on the other three cores of the quad-core processor of the platform of FIG. 3.

In the example of FIG. 5, the test module 34 is configured to test the partition 2 on the second core C1 with the implementation of a corresponding avionics software application 14 on this core C1 and simultaneously of test applications on the other three cores C0, C2 and C3 of the quad-core processor of this example. The test applications on the cores C2, and respectively C3, are further representative of contention(s) of intensity greater than a predefined contention threshold, as indicated by the bar with the mention "Contention". The test application on the first core C0 is representative of contention(s) of intensity below said contention threshold, as symbolized by the bar bearing the mention "Normal".

Figure 2:
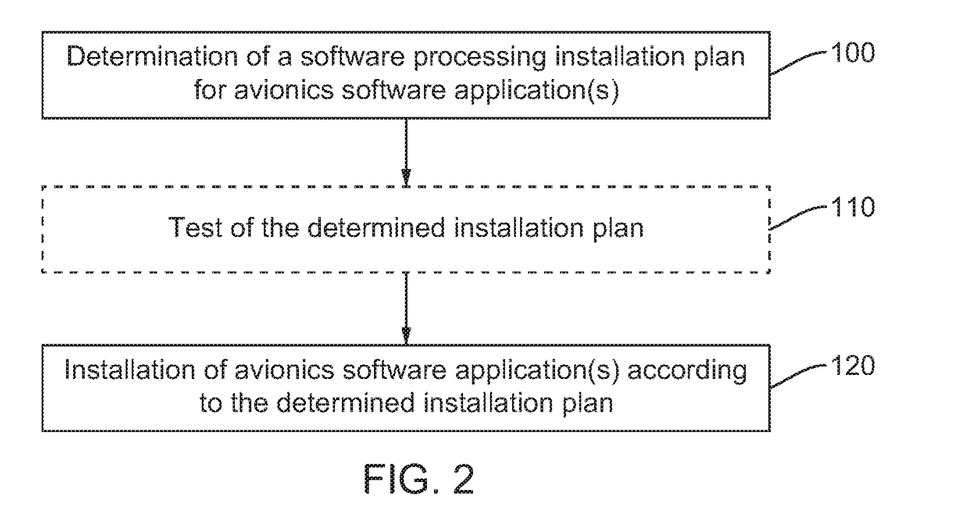
FIG. 2 is a flowchart of a method, according to the invention, for installing avionics software applications on the platform, the method being carried out by the installation device of FIG. 1.

The operation of the installation device 24 according to the invention will now be explained using FIG. 2, showing a flowchart of the method, according to the invention, for installing software applications 14 on the platform 16, the method being carried out by the electronic installation device 24.

During a step 100, the installation device 24 determines, via its determining module 30, the installation plan of the software processing operations according to at least one rule from among the first, second, third and fourth installation rules previously described, preferably from among the first installation rule and the second installation rule.

The installation plan defines, for each software processing operation, at least one core and at least one time cluster TC that are associated with said software processing operation. In the example of FIG. 3, the partitions are denoted "Part.", followed by an integer index of between 1 and 7, and the criticality level DAL associated with each application is mentioned between parentheses. In this example, for the first time cluster TC1, the installation plan then indicates the installation of the partition 1 with criticality level DAL A on the first core C0, partition 2 with criticality level DAL B on the second core C1 and partition 3 with criticality level DAL C on the third core C2. For the second time cluster TC2, the installation plan provides the installation of two partitions on the first core C0, namely partition A with criticality level DAL A and partition 5 with criticality level DAL B, and partition 6 with criticality level DAL C on the second core C1. Lastly, for the third time cluster TC3, the installation plan indicates the installation of the partition 7 with criticality level DAL A on the first core C0 and the second core C1 at once.

This installation plan of FIG. 3 in particular verifies the second installation rule, illustrated previously in light of FIG. 4, since no partition with criticality level DAL A or DAL B is provided on the third core C2 and fourth core C3, which are reserved here for avionics software applications 14 having a criticality level equal to DAL C or DAL D. In other words, the installation of critical software application(s) with criticality level DAL A or DAL B is, in this example, only possible on the first core C0 and/or on the second core C1.

One skilled in the art will observe that each time cluster TC is delimited by separations SW in the example of FIGS. 3 to 5. Each separation SW corresponds to a multi-core synchronous switching done on all of the cores of the multi-core processor.

Optionally, during the following step 110, the installation device 24 determines, via its test module 34, the installation plan previously determined by the determining module 30.

The test step 110 then includes, as previously explained in light of FIG. 5, the simultaneous implementation by the test module 34 of one or several avionics software applications 14 and one or several test applications. At least one test application is preferably representative of contention(s) with an intensity greater than a predefined contention threshold.

Lastly, during the following step 120, the installation device 24 installs, via its installation module 32 and on the platform 16, the avionics software applications 14 according to the installation plan, determined beforehand by the determining module 30, and optionally tested by the test module 34.

Thus, the method and the device 24 for installing avionics software applications 14 on the platform 16 with multi-core processor(s) make it possible to limit the risks of contention during the execution of said software applications 14 and then to facilitate the qualification of the platform 16.

Indeed, the first installation rule makes it possible to optimize the installation of the avionics software applications 14 on the platform 16 as a function of failure probabilities.

The second installation rule leads to limiting the use of the multi-core processor for the most critical applications by prohibiting certain cores of said processor for them. Typically, as illustrated in the examples of FIGS. 3 and 4, on a quad-core processor, the applications with criticality level DAL A and DAL B can only be installed on cores 0 and 1. This second installation rule then makes it possible to form a sanctuary for these critical applications in case of extreme contention. The proper working within the sanctuary is then guaranteed by the detection of these contentions and the gradual stopping of the least critical applications on the other cores 2 and 3.

With the third installation rule, the increase Maj-i is a margin resulting from the characterization of the platform 16 with respect to the contentions and then offering a safer operation of each avionics software application 14.

The fourth installation rule setting out an additional time margin Mrg-i for each critical software application makes it possible to justify better robustness in light of safety constraints for critical software applications while allowing the absorption of contentions that escaped prior characterization.

The invention claimed is:

1. A method for installing avionics software applications on a platform intended to be on board an aircraft, the platform comprising a multi-core processor having a plurality of separate cores, each avionics software application including one or several software processing operations to be executed over a predefined time period, the predefined time period including one or several successive time clusters, the installation method being implemented by an electronic installation device and comprising the following step:

determining an installation plan for the software processing operations according to at least one rule selected from the group consisting of a first installation rule and a second installation rule, the installation plan defining, for each software processing operation, at least one core and at least one time cluster that are associated with said software processing operation, the first installation rule consisting of predetermining a list of authorized combinations of criticality levels for applications intended to be executed during a same time cluster on the platform, the second installation rule consisting of prohibiting the installation of critical software application(s) on one or several cores of the plurality of cores of the multi-core processors wherein, during the determining step, the installation plan is further determined according to a third installation rule depending on a worst-case execution time of the respective software processing operation, said worst-case execution time being increased by an increase associated with the platform;

wherein for the third installation rule, the increase of the worst-case execution time depends on a predefined maximum contention rate, associated with the platform;

wherein, during the determining step, the installation plan is further determined according to a fourth installation rule consisting of taking into account an additional time margin for each critical software application; and wherein each critical software application has a criticality level corresponding to a Design Assurance Level (DAL) level defined according to standard DO-178 revision B, or according to standard ARP4754.

2. The method according to claim 1, wherein, for the first installation rule, the probability of two software applications having a same given criticality level being faulty is considered to be equal to the probability of a software application having a criticality level one unit higher than said given criticality level being faulty.

3. The method according to claim 1, wherein, for the second installation rule, each critical software application has a criticality level corresponding to the Design Assurance Level (DAL) defined according to the standard DO-178 revision B, or according to the standard ARP4754.

4. The method according to claim 3, wherein the criticality level is equal to level DAL A or to level DAL B.

5. The method according to claim 4, wherein the levels DAL A and DAL B are considered the most critical.

6. The method according to claim 1, wherein, during the determining step, the installation plan is determined according to the first and second installation rules.

7. The method according to claim 1, wherein the criticality level is equal to level DAL A or to level DAL B.

8. The method according to claim 7, wherein the levels DAL A and DAL B are considered the most critical.

9. The method according to claim 1, wherein the method further comprises testing the determined installation plan, carried out after the determining step, including a simultaneous implementation of one or several avionics software applications and one or several test applications.

10. The method according to claim 9, wherein at least one test application is representative of contention(s) with an intensity greater than or equal to a predefined contention threshold.

11. A non-transitory computer-readable medium including a computer program comprising instructions for installing avionics software applications on a platform intended to be on board an aircraft, the platform comprising a multi-core processor having a plurality of separate cores, each avionics software application including one or several software processing operations to be executed over a predefined time period, the predefined time period including one or several successive time clusters, the instructions causing an electronic installation device to:

determine an installation plan for the software processing operations according to at least one rule selected from the group consisting of a first installation rule and a second installation rule, the installation plan defining, for each software processing operation, at least one core and at least one time cluster that are associated with said software processing operation, the first installation rule consisting of predetermining a list of authorized combinations of criticality levels for applications intended to be executed during a same time cluster on the platform, the second installation rule consisting of prohibiting the installation of critical software application(s) on one or several cores of the plurality of cores of the multi-core processor;

wherein, during the determining step, the installation plan is further determined according to a third installation rule depending on a worst-case execution time of the respective software processing operation, said worst-case execution time being increased by an increase associated with the platform;

wherein for the third installation rule, the increase of the worst-case execution time depends on a predefined maximum contention rate, associated with the platform;

wherein, during the determining step, the installation plan is further determined according to a fourth installation rule consisting of taking into account an additional time margin for each critical software application; and wherein each critical software application has a criticality level corresponding to a Design Assurance Level (DAL) level defined according to standard DO-178 revision B, or according to standard ARP4754.

12. An electronic installation device for installing avionics software applications on a platform intended to be on board an aircraft, the electronic installation device comprising a processor and a memory, the platform comprising a multi-core processor having a plurality of separate cores, each avionics software application including one or several software processing operations to be executed over a predefined time period, the predefined time period including one or several successive time clusters, the electronic installation device comprising a determining module configured to determine an installation plan for the software processing operations according to at least one rule selected from the group consisting of a first installation rule and a second installation rule, the installation plan defining, for each software processing operation, at least one core and at least one time cluster that are associated with said software processing operation, the first installation rule consisting of predetermining a list of authorized combinations of criticality levels for applications intended to be executed during a same time cluster on the platform,
the second installation rule consisting of prohibiting the installation of critical software application(s) on one or several cores of the plurality of cores of the multi-core processor;
wherein the determining module is further configured to determine the installation plan according to a third installation rule depending on a worst-case execution time of the respective software processing operation, said worst-case execution time being increased by an increase associated with the platform;
wherein for the third installation rule, the increase of the worst-case execution time depends on a predefined maximum contention rate, associated with the platform;
wherein, during the determining step, the installation plan is further determined according to a fourth installation rule consisting of taking into account an additional time margin for each critical software application; and
wherein each critical software application has a criticality level corresponding to a Design Assurance Level (DAL) level defined according to standard DO-178 revision B, or according to standard ARP4754.

13. An electronic system, comprising:
a memory able to store avionics software applications;
a platform able to execute each avionics software application, the platform comprising a multi-core processor having a plurality of separate cores; and
an electronic installation device for installing avionics software applications on the platform, the electronic installation device intended to be on board an aircraft, each avionics software application including one or several software processing operations to be executed over a predefined time period, the predefined time period including one or several successive time clusters,
the electronic installation device comprising a determining module configured to determine an installation plan for the software processing operations according to at least one rule selected from the group consisting of a first installation rule and a second installation rule, the installation plan defining, for each software processing operation, at least one core and at least one time cluster that are associated with said software processing operation,
the first installation rule consisting of predetermining a list of authorized combinations of criticality levels for applications intended to be executed during a same time cluster on the platform,
the second installation rule consisting of prohibiting the installation of critical software application(s) on one or several cores of the plurality of cores of the multi-core processor;
wherein the determining module is further configured to determine the installation plan according to a third installation rule depending on a worst-case execution time of the respective software processing operation, said worst-case execution time being increased by an increase associated with the platform;
wherein for the third installation rule, the increase of the worst-case execution time depends on a predefined maximum contention rate, associated with the platform;
wherein, during the determining step, the installation plan is further determined according to a fourth installation rule consisting of taking into account an additional time margin for each critical software application; and
wherein each critical software application has a criticality level corresponding to a Design Assurance Level (DAL) level defined according to standard DO-178 revision B, or according to standard ARP4754.

* * * * *